Figure 1:
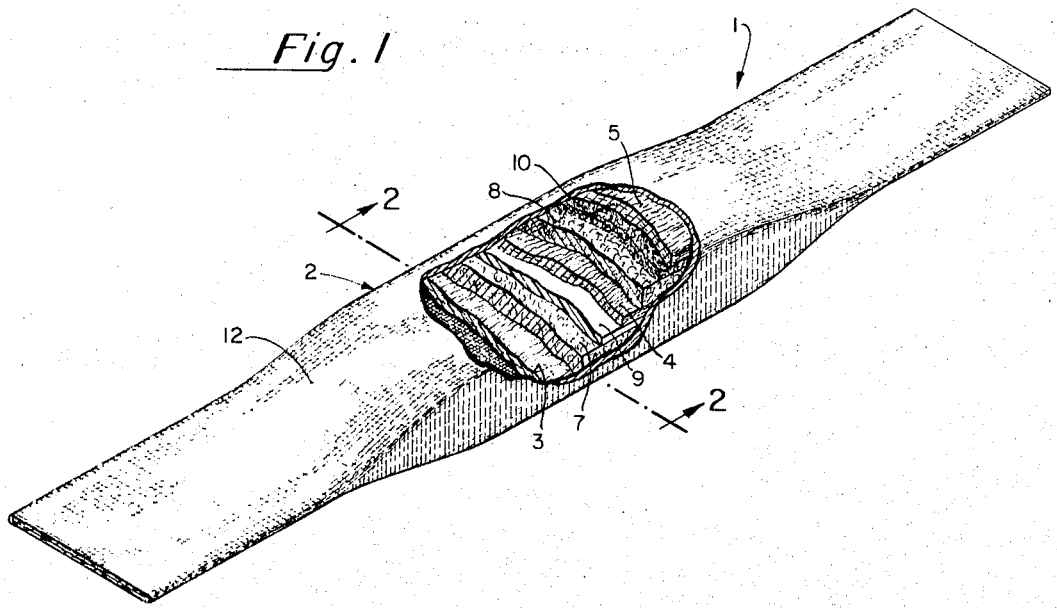

Sept. 12, 1967   E. DUDLEY ETAL   3,340,875
DEODORIZED SANITARY NAPKIN
Filed Feb. 12, 1964

INVENTORS.
ELIZABETH DUDLEY
LLOYD I. OSIPOW
BY
F. A. Beihe
ATTORNEY

United States Patent Office 3,340,875
Patented Sept. 12, 1967

3,340,875
DEODORIZED SANITARY NAPKIN
Elizabeth Dudley, Wallingford, Pa., and Lloyd I. Osipow, New York, N.Y., assignors to Scott Paper Company, Philadelphia, Pa., a corporation of Pennsylvania
Filed Feb. 12, 1964, Ser. No. 344,268
8 Claims. (Cl. 128—290)

The present invention relates to sanitary napkins or catamenial pads. More particularly, the present invention relates to the prevention of unpleasant odors in the sanitary napkin through bacterial action upon absorbed body secretions.

Application of germicides or antiseptics to sanitary napkins has proven unsatisfactory, since, to be effective, relatively high concentrations of the treating materials are necessary either to kill or to inhibit the growth of odor-forming bacteria. Such concentrations of antiseptic are undesirable because of the possible chemical activity of the treated napkin and the possibility of chemical irritation of body membranes.

The present invention is based upon the discovery that a superior degree of odor control may be attained in sanitary napkins by the presence of material capable of adsorbing odor, consisting of an activated clay, or the like, in admixture with a cation exchange type solid material, such admixture being in pulverulent form for maximum surface area and active vapor absorptivity, and so disposed as to insure substantially complete coverage of the effective area of the napkin. As one of the cation exchange resins, a condensation product of N-carbamyl maleamic acid, melamine and formaldehyde is useful. The preferred location for the odor-absorbent material is upon the interior surface of the outermost layer of crepe wadding in the absorbent pad or napkin filler which will be placed toward the body in use. In this placement, supplemental coverage afforded by the additional elements of the napkin cover and wrapper will aid in shielding the added material against bodily contact. For simplicity in manufacture, the odor-absorbent material is disposed upon the uppermost layer of creped wadding, a normal element of sanitary napkin pads, during assembly of such pads and is secured thereto by means of a suitable bonding agent or adhesive.

The bacterial decomposition of the menstrual discharge normally takes place on the alkaline side and is characterized by the generation of volatile amines and ammonia. Because of the alkaline nature of these gases, the cation exchange resins are particularly effective in reacting with and neutralizing these gases. However, it appears that there are also neutral gases, for example, possibly aldehydes and ketones, that are not absorbed by ion-exchange resins and hence it has been found advantageous to use along with the ion-exchange resins an adsorbent of the type of activated clay whose adsorbent ability depends upon a high order of surface area and is capable of adsorbing neutral gases. Likewise, it has been found that the use of clay alone is less effective than the mixture, probably because the copious evolution of the basic or alkaline gases requires a more specific type of adsorption than afforded by the clay alone. Additionally, the clay serves the purpose of an extender or diluent for the smaller quantity of ion-exchange resin and provides a convenient means of spreading the small quantity resin evenly over the required surfaces.

Adsorbent clays are recognized as belonging to two general classes: (1) those possessing adsorbent properties in their natural state and which are usually referred to as "fuller's earth" and (2) those which acquire adsorbent qualities as the result of a processing treatment usually by mineral acids or by heat. These are referred to as "activated clay." A type of bentonite characterized by being non-swelling in water is often used in preparing activated clay. A product found satisfactory in the practice of this invention is marketed under the name Neutral Grade 40 by the Filtrol Corporation, Los Angeles, California.

Other closely related materials that have also been found effective in this process are the following: Attapulgus clay, which possesses a unique, needle-like structure and is adsorbent in its natural state; activated bauxite, a mineral consisting largely of aluminum oxide, and possessing adsorbent properties as a result of thermal treatment; and activated silica, most commonly used as an adsorbent in the form of "diatomaceous earth."

As previously explained, it is impractical to depend completely upon a germicide or antiseptic to prevent odor in sanitary napkins. However, with adsorbent material present in accordance with the teaching of this invention, additional benefit may be obtained by the presence of a mild antiseptic. Thus, the incorporation of a mild antiseptic, of which Hyamine 1622 manufactured by the Rohm and Haas Company of Philadelphia is an example, in an amount of from about 0.01 gram to about 0.03 gram per napkin is advantageous. In this way, although complete prevention of bacterial growth is not attained, the growth, and hence the odor generation, is appreciably reduced, and protection from odor is completely maintained for a longer period of time.

Figure 2:
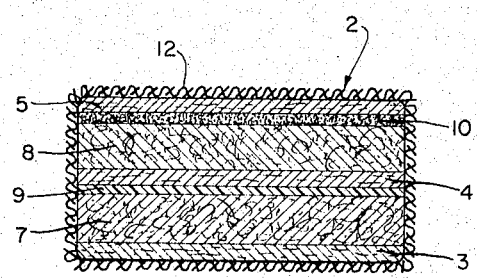

The several advantages of this invention will be readily apparent from the following detailed description of a preferred embodiment thereof when taken in conjunction with the accompanying drawing, wherein:

FIGURE 1 is a perspective view of a sanitary napkin embodying the inventive concept, with portions broken away in order that the inner constructional detail may be seen; and FIGURE 2 is an enlarged sectional view taken along the line 2—2 of FIGURE 1.

As shown in the drawing, sanitary napkin 1 is composed of an absorbent pad 2 formed of a plurality of spaced layers 3, 4 and 5 of creped wadding or multi-layered cellulose tissue and intermediate fillers 7 and 8 comminuted fibrous material, ordinarily termed "fluff." The central layer 4 of wadding carries a barrier element 9, which can be a thin film of plastic, as for example, polyethylene, or a comparable impermeable membrane, to prevent "strike through."

The top layer 5 of wadding has, dispersed over its lower or inner surface, deodorizing media 10 which may include a suitable bonding agent, such as polyvinyl alcohol, through which material dislodgement in storage or use is minimized.

Instead of disposing the deodorizing media 10 as illustrated by the drawing, it may also be spread and dispersed between layers 5 and 8 and 3 and 7. Similarly, the deodorizing media may be disposed in a U-shaped fashion around the outer periphery of elements 5, 8 and 4. This dispersal will result in a thinner layer and may, in certain applications, be more advantageous. The preferred disposal of medium 10 is as illustrated in FIGURE 2. The multiple element pad 2 is encased in a wrapper 12 of gauze, non-woven fabric or other covering as desired.

The deodorizing media 10, as has been indicated, is a mixture of a neutral clay and, in its preferred form, a polycarboxylic type ion-exchange resin. These ion exchange-resins, which are non-toxic, odor-free, non-irritating materials have exhibited a remarkable property for minimizing to a substantial degree bacteria-induced decomposition of menstrual fluids. For example, these resins possess a special affinity for ammonia and the amines present in bacterial decomposition products and will absorb such gaseous compounds which may be generated within the napkin pad. Activated alumina, activated silica, the neutral clays, bentonite, attapulgite infusorial clay and similar particulate porous materials have a high adsorptive capacity for noxious gases, whether of a basic or acidic nature. By complementing the adsorption of gases the resins are not capable of effectively neutralizing or eliminating; the inorganic materials coact with the resin to produce a more effective combination of odor eliminating medium.

The ion-exchange resins of greatest utility for the specific purposes of this invention are the Amberlites, available from Rohm and Haas Company, Philadelphia, Pa., which are produced by the copolymerization of divinyl benzene and methacrylic or acrylic acids. Another cation-exchange resin suitable for this invention may be made by combining, in stoichiometric proportions, N-carbamyl maleamic acid, melamine and formaldehyde. Condensation of these reactants results in a resinous product which precipitates from the reaction mixture, and, after drying, may be admixed with a neutral clay. Comparable resins in which urea and thiourea have been substituted for melamine in the reaction mixture will serve equally as well in the odor-absorbent media.

It has been established that the mixture of ion-exchange resin and neutral clay, which latter component may be replaced by activated carbon, activated alumina, diatomaceous earth, infusorial clays, activated silica or attapulgite clay, should be present in the pad of a sanitary napkin in an amount of from about 0.1 to about 2 grams. The preferred amount of ion-exchange resins and clay material is of from 0.15 to 1 gram; an amount of from about 0.20 to about 0.40 gram gives over-all optimum balance. Generally, the odor absorbent represents from about 0.7% to about 7% by weight of the conventional sanitary napkins. In the combined form, the odor absorbent will be composed of from 1% to 25%, preferably from 5% to 25%, by weight of ion-exchange resin to from 99% to 75%, preferably 95% to 75%, by weight of clay or other activated material, in a conventional mechanical admixture. A particularly effective composition is composed of 15% by weight of Amberlite XE–64 (obtained from Rohm and Haas Company, Philadelphia, Pa.) and 85% by weight of the above-listed inorganic material having a particle size in the range of 100–300 mesh, the particulate mixture being distributed over and adhered to an inner surface of the outermost layer of cellulose wadding in the napkin absorbent pad through the medium of polyvinyl alcohol.

Other useful ion-exchange resins besides those previously mentioned are Amberlite XE–89; XE–69; and MB–2—all available from Rohm and Haas Company. Amberlite XE–89 and XE–64 are polycarboxylic-type ion-exchange resins. Amberlite MB–2 is a mixed acidic-basic type resin, while Amberlite XE–69 is a strongly acidic-type resin especially suitable for pharmaceutical applications.

It will at once be obvious that changes and variations in the component parts of the napkin construction, and their relationship are possible without departing from the spirit and scope of the invention as defined in the appended claims.

What is claimed is:

1. A sanitary napkin comprising an absorbent pad, a liquid-permeable wrapper therefor, and a mixture of a polycarboxylic-type ion-exchange resin and a neutral adsorbent material selected from the group consisting of activated carbon, activated alumina, activated silica, diatomaceous earth, infusorial clay and attapulgite clay in particulate form disposed upon and carried by said absorbent pad as a medium of odor control.

2. A sanitary napkin comprising an absorbent pad, a liquid-permeable wrapper therefor, and from 0.1 to 1.0 gram of a mixture of a polycarboxylic-type ion-exchange resin and a neutral adsorbent material selected from the group consisting of activated alumina, activated silica, diatomaceous earth, infusorial clay and attapulgite clay in particulate form disposed upon and carried by said absorbent pad as a medium of odor control therefor.

3. A sanitary napkin comprising an absorbent pad, a liquid-permeable wrapper and a mixture of polycarboxylic-type ion-exchange resin and a neutral adsorbent material selected from the group consisting of activated carbon, activated alumina, activated silica, diatomaceous earth, infusorial clay and attapulgite clay in an amount approximately from 0.07% to 7.0% of the total weight of the napkin disposed upon and carried by said absorbent pad as a medium of odor control.

4. A sanitary napkin comprising an absorbent pad, a liquid-permeable wrapper therefor and an odor-absorbent composition formed of approximately 15% by weight of a polycarboxylic-type ion exchange resin in admixture with approximately 85% by weight of activated clay in particulate form disposed upon and carried by said absorbent pad.

5. A sanitary napkin comprising an absorbent pad, a liquid-permeable wrapper therefor and an odor-absorbent composition formed of approximately 15% by weight of a polycarboxylic-type ion-exchange resin in admixture with approximately 85% by weight of a polycarboxylic-type ion-exchange resin in admixture with approximately 85% by weight of an activated clay in particulate form disposed upon and carried by said absorbent pad, the odor-absorbent composition making up about 0.7% to about 7% of the total weight of the napkin.

6. A sanitary napkin as defined in claim 5 in which the ion-exchange resin is a copolymer of divinyl benzene and methacrylic acid.

7. A sanitary napkin as defined in claim 1 in which the ion-exchange resin is a condensation product of N-carbamyl maleamic acid, melamine, and formaldehyde.

8. A sanitary napkin as defined in claim 5 in which the ion-exchange resin is a condensation product of N-carbamyl maleamic acid, melamine, and formaldehyde.

References Cited

UNITED STATES PATENTS

| | | | |
|---|---|---|---|
| 3,094,494 | 6/1963 | Hopkins et al. | 128—290 X |
| 3,124,135 | 3/1964 | Olson | 128—290 |
| 3,149,023 | 9/1964 | Bodendorf et al. | |

RICHARD A. GAUDET, *Primary Examiner.*

CHARLES F. ROSENBAUM, ROBERT E. MORGAN,
*Examiners.*